US005630075A

United States Patent [19]
Joshi et al.

[11] Patent Number: 5,630,075
[45] Date of Patent: May 13, 1997

[54] WRITE COMBINING BUFFER FOR SEQUENTIALLY ADDRESSED PARTIAL LINE OPERATIONS ORIGINATING FROM A SINGLE INSTRUCTION

[75] Inventors: Mandar S. Joshi, Beaverton; Andrew F. Glew, Hillsboro; Nitin V. Sarangdhar, Beaverton, all of Oreg.

[73] Assignee: Intel Corporation, Santa Clara, Calif.

[21] Appl. No.: 450,397

[22] Filed: May 25, 1995

Related U.S. Application Data

[63] Continuation of Ser. No. 175,800, Dec. 30, 1993, abandoned.

[51] Int. Cl.$^6$ ........................................... G06F 5/06
[52] U.S. Cl. ........................................... 395/250
[58] Field of Search .................. 364/239, 239.1, 364/239.7, 246.11, 239.2, 246; 395/250, 566, 394, 872

[56] References Cited

U.S. PATENT DOCUMENTS

| | | | |
|---|---|---|---|
| 4,750,154 | 6/1988 | Lefsky et al. | 365/189 |
| 4,805,098 | 2/1989 | Mills, Jr. et al. | 395/250 |
| 4,959,771 | 9/1990 | Ardini et al. | 364/200 |
| 5,224,214 | 6/1993 | Rosich | 395/425 |
| 5,235,693 | 8/1993 | Chinnaswamy et al. | 395/425 |
| 5,357,622 | 10/1994 | Parks et al. | 395/425 |
| 5,386,531 | 1/1995 | Blaner et al. | 395/425 |
| 5,388,222 | 2/1995 | Chisuin et al. | 395/275 |

OTHER PUBLICATIONS

Popescu, et al., "The Metaflow Architecture," IEEE Micro, pp. 10–13 and 63–73, Jun. 1991.

Primary Examiner—Richard L. Ellis
Attorney, Agent, or Firm—Blakely, Sokoloff, Taylor & Zafman

[57] ABSTRACT

A microprocessor having a bus for the transmission of data, an execution unit for processing data and instructions, a memory for storing data and instructions, and a write combining buffer for combining data of at least two write commands into a single data set, wherein the combined data set is transmitted over the bus in one clock cycle rather than two or more clock cycles. Thereby, buss traffic is minimized. The write combining buffer is comprised of a single line having a 32-byte data portion, a tag portion, and a validity portion. The tag entry specifies the address corresponding to the data currently stored in the data portion. There is one valid bit corresponding to each byte of the data portion which specifies whether that byte currently contains useful data. So long as subsequent write operations to the write combining buffer result in hits, the data is written to the buffer's data portion. But when a miss occurs, the line is reallocated, and the old data is written to the main memory. Thereupon, the valid bits are cleared, and the new data and its address are written to the write combining buffer.

34 Claims, 5 Drawing Sheets

WRITE COMBINING BUFFER FOR SEQUENTIALLY ADDRESSED PARTIAL LINE OPERATIONS ORIGINATING FROM A SINGLE INSTRUCTION

This is a continuation of application Ser. No. 08/175,800, filed Dec. 30, 1993 now abandoned.

FIELD OF THE INVENTION

The present invention pertains to the field of data transmissions in a bus architecture. More specifically, the present invention relates to utilizing a write combining buffer maximizing the bus efficiency.

BACKGROUND OF THE INVENTION

A computer system can be broken into three basic blocks: a central processing unit (CPU), a memory, and one or more input/output (I/O) interfaces. These blocks are interconnected by a bus. The blocks communicate to one another by transmission of digital data over the bus. An input device such as a keyboard, mouse, disk drive, analog-to-digital converter, etc., is used to input instructions and data to the computer system via the I/O interface. These instructions and data can be stored in memory. The CPU retrieves the data from the memory and processes it as directed by the computer program. The results can then be stored back into memory or outputted for display via the I/O interface to an output device such as a printer, cathode-ray tube (CRT) display, etc.

In the past, CPUs were rather unsophisticated. They could only process a limited number of bits per clock cycle. For example, early microprocessors tended to be 8-bit machines. Eventually, with rapid advances in semiconductor and computing technology, 16, 32, and even 64-bit microprocessors were developed. These microprocessors were also designed to operate at higher clock frequencies. In addition, the advances in semiconductor technology led to memory chips having greater storage capacities. This combination of increased processing power and storage capacity have lead to more powerful, versatile, and faster computer systems.

Ever greater amounts of data needed to be transmitted between the processor and the memory. Consequently, higher data transmission rates were implemented. But eventually, it became unfeasible to continue increasing the data rate due to physical limitations. One solution to this problem was to increase the bus width. Thereby, more bits of data can be transmitted over the bus per clock cycle. However, utilizing a wider bus is disadvantageous in some aspects. A wider bus consumes more of the silicon area. Hence, a larger die is required. Increasing the die size directly translates into increased production costs because less dies (i.e., chips) can be fabricated for any given wafer. Furthermore, a wider bus consumes more power. Minimizing power consumption is of critical importance in laptop, notebook, and other portable computer systems. Moreover, increasing the bus width adds to the overall complexity of the chip.

In many instances, the benefits conferred by a wider bus width outweighs its attendant disadvantages. However, if a computer program happens to be transmitting many sets of data, one small piece at a time, the overall bus traffic is increased. For certain operations such as string moves, string copies, or bit block transfers in graphics applications, cached memory accesses waste bus bandwidth with read-for-ownership cache line fills, when most accesses are writes in other words, while the individual small pieces of data are being transmitted over the wide bus, other components wishing to transmit data or waiting to receive data must wait until the bus becomes available. Consequently, the data throughput is reduced, notwithstanding a wider bus width.

Therefore, there is a need in the prior art for an apparatus and method for improving the efficiency of bus utilization.

SUMMARY OF THE INVENTION

The present invention pertains to a write combining buffer for use in a microprocessor. The microprocessor fetches data and instructions which are stored by an external main memory. The data and instructions are sent over a bus. The microprocessor then processes the data according to the instructions received. When the microprocessor completes a task, it writes the data back to the main memory for storage. In the present invention, a write combining buffer is used for combining the data of at least two write commands into a single data set, wherein the combined data set is transmitted over the bus in one clock cycle rather than two or more clock cycles. Thereby, bus traffic is minimized.

In the currently preferred embodiment, the write combining buffer is comprised of a single line having a 32-byte data portion, a tag portion, and a validity portion. The tag entry specifies the address corresponding to the data currently stored in the data portion. There is one valid bit corresponding to each byte of the data portion which specifies whether that byte currently contains useful data. So long as subsequent write operations to the write combining buffer result in hits, the data is written to the buffer's data portion. In other words, write hits to the write combining buffer result in the data being combined with previous write data. But when a miss occurs, the line is reallocated, and the old data is written to the main memory. Only those bytes which have been written to as indicated by the valid bits, are written back to the main memory. Each time the write combining buffer is allocated, the valid bits are cleared. Thereupon, the new data and its address are written to the write combining buffer.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for achieving high performance bus transmissions is described. In the following description, for purposes of explanation, numerous specific details are set forth, such as buffers, bus widths, data sizes, cache systems, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention. Furthermore, the present invention can be applied to a wide range of processor architectures including but not limited to PowerPC™, Alpha™, Intel™ architecture microprocessors, etc. Moreover, the present invention can be implemented in a variety of semiconductor processes such as silicon, gallium arsenide, etc. The present invention can also be designed as a single chip or integrated on several individual chips.

Figure 1:
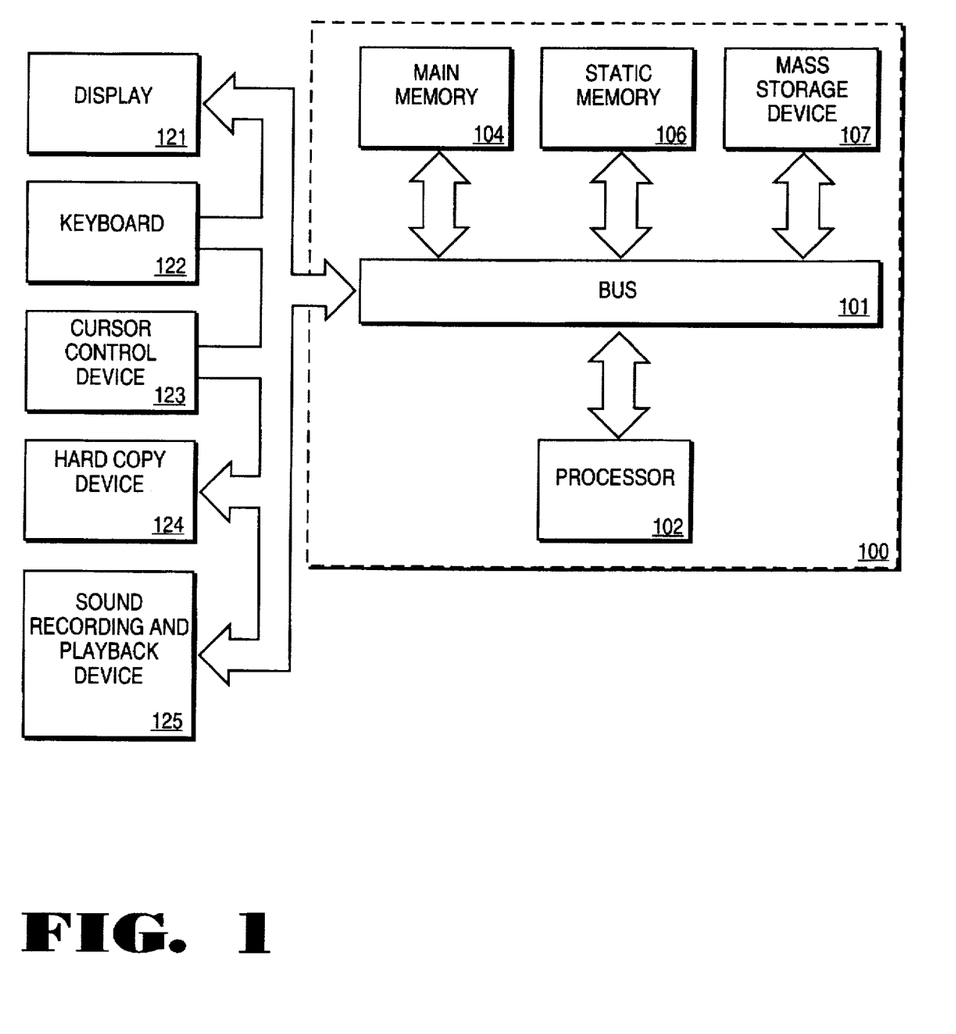
FIG. 1 shows the computer system upon which a preferred embodiment of the present invention is implemented.

Referring to FIG. 1, the computer system upon which a preferred embodiment of the present invention is implemented is shown as 100. Computer system 100 comprises a bus or other communication means 101 for communicating information, and a processing means 102 coupled with bus 101 for processing information. Processor 102 includes, but is not limited to microprocessors such as the Intel™ architecture microprocessors, PowerPC™, Alpha™, etc. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions.

Computer system 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Furthermore, a sound recording and playback device, such as a speaker and microphone may optionally be coupled to bus 101 for interfacing with computer system 100. Note that any or all of the components of system 100 and associated hardware may be used in a preferred embodiment, however, it can be appreciated that any type of configuration of the system may be used for various purposes as the user requires.

Figure 2:
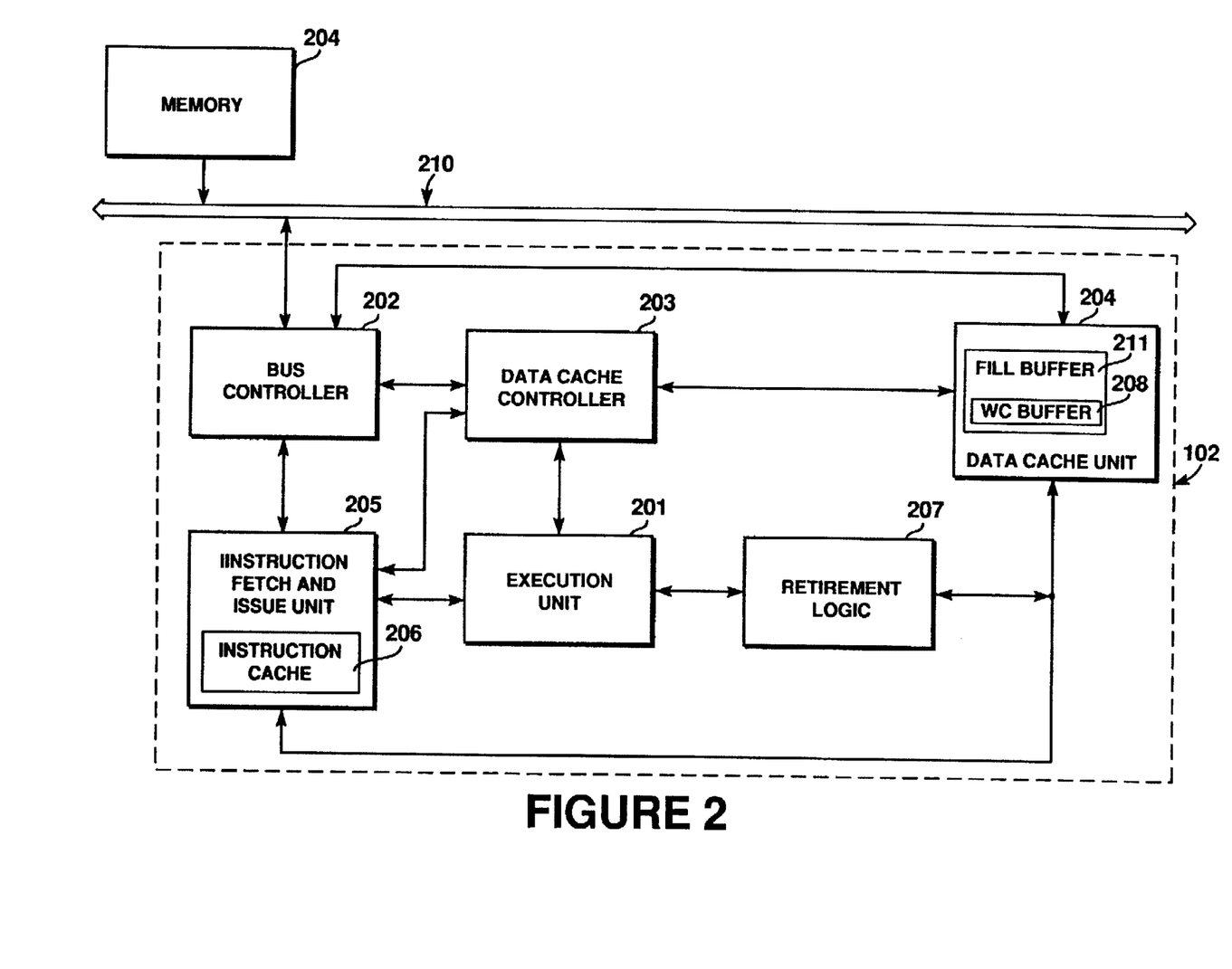
FIG. 2 shows an exemplary processor incorporating the teachings of the present invention.

Referring now to FIG. 2, a block diagram illustrating an exemplary processor 102 incorporating the teachings of the present invention is shown. The exemplary processor 102 comprises an execution unit 201, a bus controller 202, a data cache controller 203, a data cache unit 204, and an instruction fetch and issue unit 205 with an integrated instruction cache 206. The elements 201–206 are coupled to each other as illustrated. Together they cooperate to fetch, issue, execute, and save execution results of instructions in a pipelined manner.

The instruction fetch and issue unit 205 fetches instructions from an external memory through the bus controller 202 via an external system bus. Bus controller 202 manages transfers of data between external components and processor 102. In addition, it also manages cache coherency transfers.

The instruction fetch and issue unit 205 then issues these instructions to the execution unit 201 in an in-order sequence. Basically, the execution unit 201 performs such functions as add, subtract, logical AND, and integer multiply. Some of these instructions are fetched and issued speculatively. The execution unit 201 holds and executes the integer and floating point instructions when their operand dependencies on execution results of preceding instructions are resolved. This includes those integer and floating point instructions that are speculatively fetched and issued.

In similar fashion, the execution unit 201 holds and forwards the load and store instructions to the retirement logic 207. Retirement logic 206 commits the states of these instructions to whatever permanent architectural state that was designated by the original source code. Data cache controller 203 controls the access of data to/from the data cache unit 204. Data cache unit 204 contains a fast, small, hardware-maintained scratchpad memory which can be reached in fewer clock cycles than main memory by loads and stores. When a program tries to retrieve a data value from memory, it is performing a "load", and when the program changes a value held in memory, it is performing a "store".

The data cache controller 203 and the data cache unit 204 respond to the load instructions immediately, forwarding data if necessary. In contrast, store instructions are buffered. In other words, instructions are not necessarily executed/forwarded in the order they were issued. Moreover, some instructions are speculatively executed/forwarded. In any case, the execution results of the integer, floating point, and load instructions are buffered, and then retired or committed in order. In comparison, the buffered store instructions are retired or committed in order and then executed in the "background," at the convenience of the memory system. Speculative Integer, floating point, and load execution results and buffered stores of mis-predicted branches are purged.

The Instruction fetch and execution unit 205 is intended to represent a broad category of instruction fetching and issuing elements found in many computer systems. Their constitutions and functions are well known and will not be further described. In the presently preferred embodiment, the instruction fetch and issue unit 205 includes an instruction cache 206. The instruction cache 206 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 205 to decide which instruction cache entry ought to be accessed next for maximal program performance.

In the currently preferred embodiment, the instruction cache 206 and data cache unit 204 exists in a memory hierarchy. The hierarchy is comprised of a small but extremely fast L1 cache. If a memory access to the L1 cache results in a miss, the access is passed on to a bigger, but slower, L2 cache. And if that also results in a miss, the memory access goes to the L3 cache or to the main memory if the processor happens to not have an L3 cache. The data cache controller 203 is used for page miss handling. Furthermore, there is no requirement for the instructions to be fetched from aligned memory locations in other words, an instruction may be fetched from memory locations spanning two cache lines. However, it will be appreciated that the present invention may be practiced with or without an instruction cache, or with a combined instruction/data cache.

If an instruction cache is implemented, page misses may be handled by a dedicated page miss handler, and instructions may be fetched from aligned memory locations.

In the currently preferred embodiment, a write combining buffer 208 is implemented as part of the data cache unit 204. The write combining buffer 208 collects write operations which belong to the same cache line address. Several small write operations (e.g., string moves, string copies, bit block transfers in graphics applications, etc.) are combined by the write combining buffer 208 into a single, larger write operation. It is this larger write, which is eventually sent over the bus, thereby maximizing the efficiency of bus transmission. In one embodiment, the write combining buffer 208 resides within the fill buffer 211.

The write combining function is an architectural extension to the cache protocol. Special micro-operations (uops are simple instructions including its micro-opcode, source fields, destination, immediates, and flags) are defined for string store operations and stores to an USWC memory types to cause the data cache unit to default to a write combining protocol instead of the standard protocol. Write combining is allowed for the following memory types: Uncached Speculatable Write Combining (USWC), Writeback (WB), and Restricted Caching (RC). The USWC memory type is intended for situations where use of the cache should be avoided for performance reasons. The USWC memory type is also intended for situations where data must eventually be flushed out of the processor, but where delaying and combining writes is permissible for a short time. The WB memory type is conventional writeback cached memory. The RC memory type is intended for use in frame buffers. It is essentially the same as the WB memory type, except that no more than a given (e.g., 32K) amount of RC memory will ever be cached. Write combining protocol still maintains the coherency with external writes. It avoids the penalty of coherence by deferring the coherence actions until eviction.

An implementation of the current invention is possible whereby there are multiple WC buffers, permitting interleaved writes to different addresses to be combined. This would create a weakly ordered memory model, however, and therefore could not be used by some existing programs.

The currently preferred embodiment appears to have only one WC buffer evicting when missed. This permits the WC buffer to be used when a write ordering is required; for example, it permits the invention to be used in the existing Intel™ Architecture block memory instructions PEP STOSX and PEP MOVSX.

The currently preferred embodiment uses a structure that already exists in the Intel™ Architecture microprocessor, the fill buffers. The fill buffers are a set of several (4) cache lines with byte granularity valid and dirty bits, used by the out-of-order microprocessor to create a non-blocking cache. The WC buffer is a single fill buffer marked to permit WC stores to be merged. When evicted, the WC fill buffer waits until normal fill buffer eviction.

In the currently preferred embodiment, only one write combining buffer is implemented. Physically, any fill buffer can used as the write combining buffer. Since only one logical write combining buffer is provided, when a second write combining buffer is needed, an eviction process is initiated. During eviction, one of the following actions can occur. If all the bytes are written, and the write combining buffer is of cacheable (i.e., RC or WB) type, then the data cache unit requests an AllocM transaction to the bus. An AllocM transaction is where a bus transaction that causes all other processors to discard stale copies of the cache line without supplying the data. When this transaction is completed, the line is placed in the cache. If all the bytes are not written, and the write combining buffer is of a cacheable (i.e., RC or WB) type, then the data cache unit requests read-for-ownership (RFO) transaction to the bus. The RFO transaction entails a read directing any other processor to supply data and relinquish ownership. Thereupon, the line is placed in the cache. If all the bytes are written and the write combining buffer is of the USWC type, then the data cache unit requests a writeback transaction to the bus. If all the bytes are not written, and the write combining buffer is of the USWC type, then the data cache unit evicts the write combining buffer. The eviction is performed as a sequence of up to four partial writes of four sets of data. The data cache unit supplies eight byte enables to the bus with each set. If a data set does not contain any written bytes, the data cache unit does not issue a partial write for that set.

Figure 3:
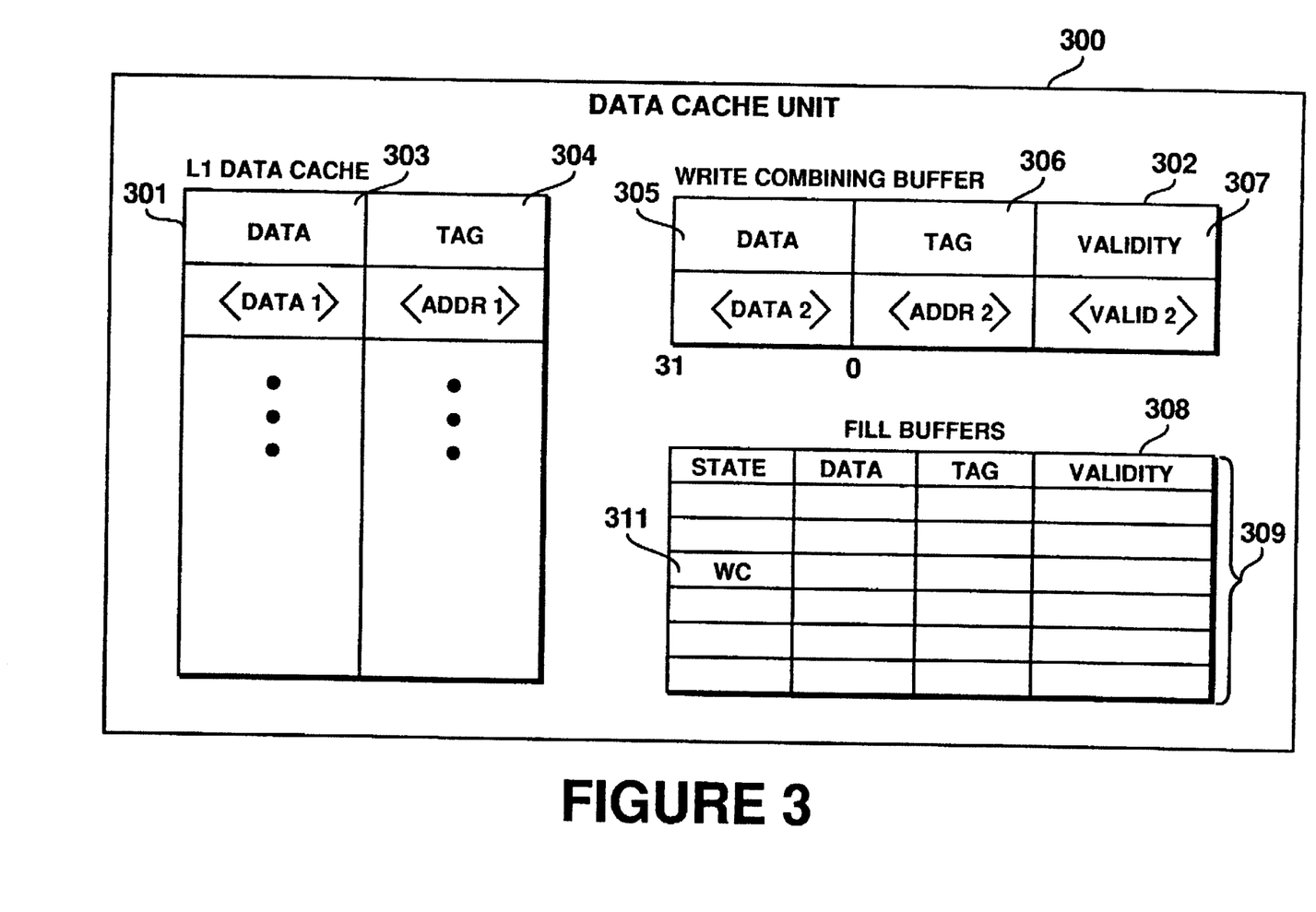
FIG. 3 shows a more detailed block diagram of the data cache unit

FIG. 3 shows a more detailed block diagram of the data cache unit 300. The data cache unit 300 includes a level 1 data cache 301 and a write combining buffer 302. The level 1 data cache 301 is a standard SRAM writeback cache memory. In a writeback configuration, the CPU updates the cache during a write operation. The actual main memory is updated when the line is discarded from the cache. Level 1 data cache 301 includes a data cache RAM portion 303 which is used to store copies of data or instructions. A separate tag RAM portion 304 is used as a directory of entries in data RAM portion 303. A number of tags corresponding to each entry are stored in tag RAM 304. A tag is that portion of the line address that is used by the cache's address mapping algorithm to determine whether the line is in the cache.

Write combining buffer 302 is comprised of a single line having a data portion 305, a tag portion 306, and a validity portion 307. Data portion 305 can store up to 32 bytes of user data. Not every byte need contain data. For example, the execution unit may choose to store data in alternating bytes. The validity portion 307 is used to store valid bits corresponding to each data byte of data portion 305. The valid bits indicate which of the bytes of data portion 305 contain useful data. In the above example wherein data is stored in alternating bytes, every other valid bit is set. In this manner, when the line in the write combining buffer 302 is written to the level 1 data cache 301, only those bytes containing valid data are stored.

When data is being written to the data cache unit 300, there are three possible scenarios that can occur. First, there could be a level 1 data cache hit. A cache hit is defined as a data or instruction cycle in which the information being read or written is currently stored in that cache. In this situation, the data is directly copied to the level 1 data cache 301. For example, a write combine store byte uop (i.e., WC Stob instruction) having an address 1 and data 1 falls in this scenario because the tag column 304 of level 1 data cache 301 currently contains a tag of <addr1>. Thus, <data1> is stored in the data portion 303 of the level 1 data cache 301.

In the second scenario, the write operation results in a hit of the write combining buffer 302. In this case, the data is stored in the write combining data portion 305. For each byte that is written, the corresponding valid bit is set. For example, a write combine store byte uop (i.e., WC Stob) having an address of <addr2> has its data <data2> written to the data portion 305 of write combining buffer 302 because there is a miss of <addr2> in the level 1 data cache 301, and there is a hit of <addr2> in the write combining buffer 302. Any subsequent write operations that fall within the 32-byte data field will be written to the write combining buffer 302 until that line eventually is evicted and a new address (i.e., tag) is assigned. For example, suppose that the tag of the write combining buffer contains the address 0X12340. Subsequently, a write combine store word uop (i.e., WC Stow) to 0X12346 is received. Since the 0X12346 address falls within the 32-byte range of 0X12340, that word is stored in the write combining buffer. In contrast, if a WC Stow to address 0X12351 request is received, the write combining buffer must be reallocated because the address falls outside the 32-byte boundary.

In the third scenario, there is a complete miss to both the level 1 data cache 301 and the write combining buffer 302. For this scenario, the contents in the write combining buffer 302 are purged to the main memory (not shown). All of the valid bits are then cleared. The new data is stored in the data portion 305; its address is stored in the tag portion 306; and the valid bits corresponding to those bytes of data which were written are set. For example, a write combine store byte uop (i.e., WC Stob) having an address of <addr3> will result in a miss of both the level 1 data cache 301 and the write combining buffer 302. Hence, the <data2> currently stored in write combining buffer 302 is written to the main memory at a location specified by <addr2>. Thereupon, <data3> can be stored in the data portion 305 of write combining buffer 302. Its address <addr3> is stored in the tag portion 306, and the appropriate valid bit(s) are set. It should be noted that the execution of the write combining procedure is transparent to the application program.

In one embodiment, the DCU 300 includes the fill buffers 308. Fill buffers 308 is comprised of multiple lines 309. Each of these multiple lines 309 is divided into state, data, tag, and validity fields. The state for one of these lines can be write combining (WC) 311.

Figure 4:
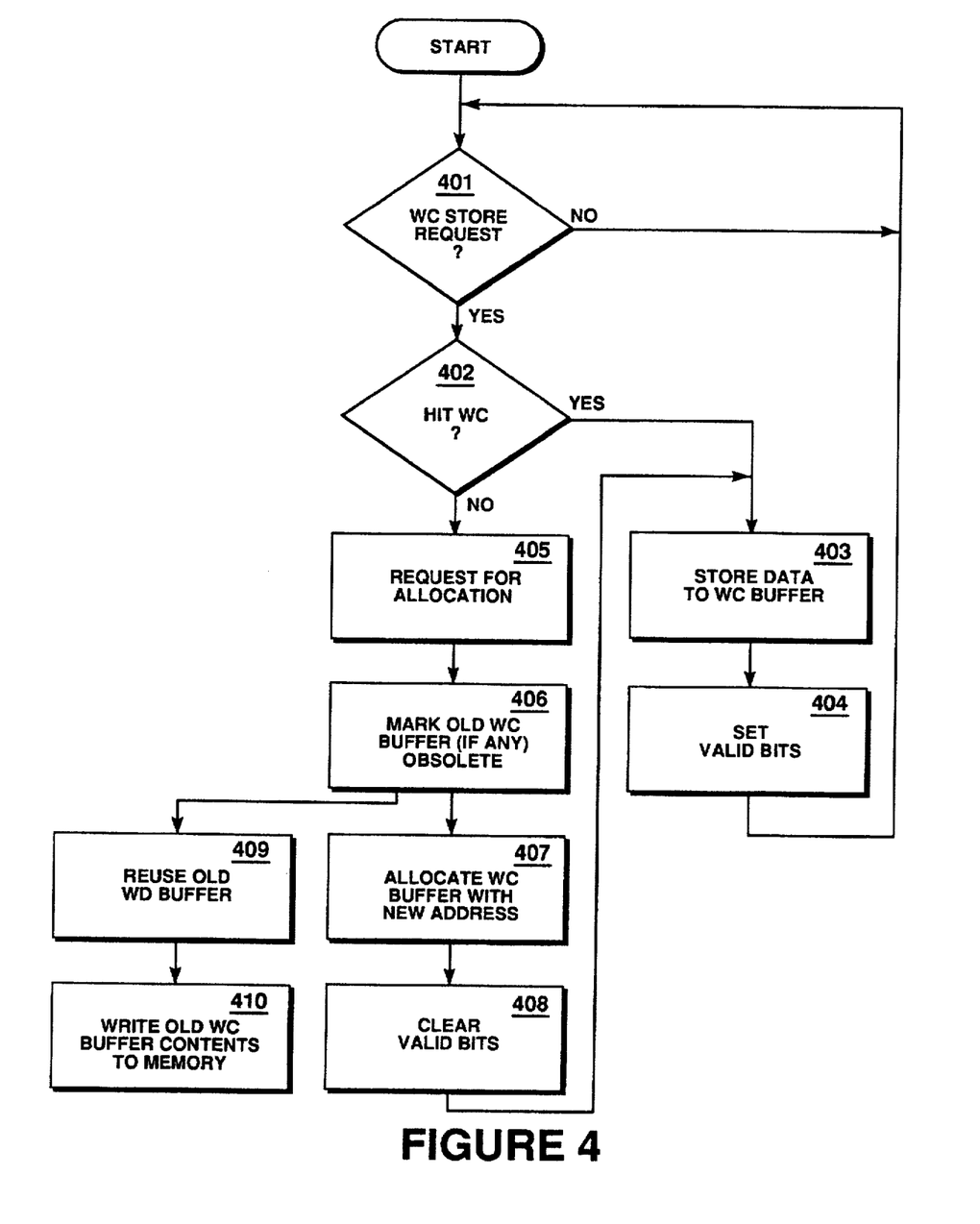
FIG. 4 is a flow chart showing the steps of the write combining procedure of the present invention.

FIG. 4 is a flow chart showing the steps of the write combining procedure of the present invention. The processor continues its execution process until a write combine (WC) store request is encountered, step 401. A WC store request can be generated in several ways. In one instance, a special write combine uop is used to indicate that a store is to be write combined. In another instance, a particular block of memory is designated for applying the write combining feature. In other words, any stores having an address that falls within that particular block of memory is designated as a write combine store.

Once a write combine store request is received, a determination is made as to whether the request results in a write combining buffer hit, step 402. This is accomplished by comparing the current tag of the write combining buffer with the store's address. If there is a hit (i.e., the two addresses match), the store is made to the write combining buffer, step 403. The corresponding valid bit(s) are set, step 404. The processor then waits for the next write combine store request, step 401. So long as subsequent stores are to that same address (i.e., WC store falls within the 32-byte range), the store continues to be to the write combining buffer.

Otherwise, if it is determined in step 402 that the store results in a miss to the write combining buffer, then steps 405–410 are performed. In step 405, the processor generates a request for allocation. An allocation refers to the assignment of a new value to a tag. This occurs during a line fill operation, wherein the information is transferred into the cache from the next outer level (e.g., from the write combining buffer to the level 1 cache, level 2 cache, or main memory). The old WC buffer (if any) is marked as being obsolete, step 406. The write combining buffer is allocated with the new address, step 407. The valid bits are all cleared, step 408. Next, steps 403 and 404 described above are executed. Furthermore, following step 406, the old contents of the WC buffer are written to memory, step 409. Thereupon, the old WC buffer can be reused, step 410.

Figure 5:
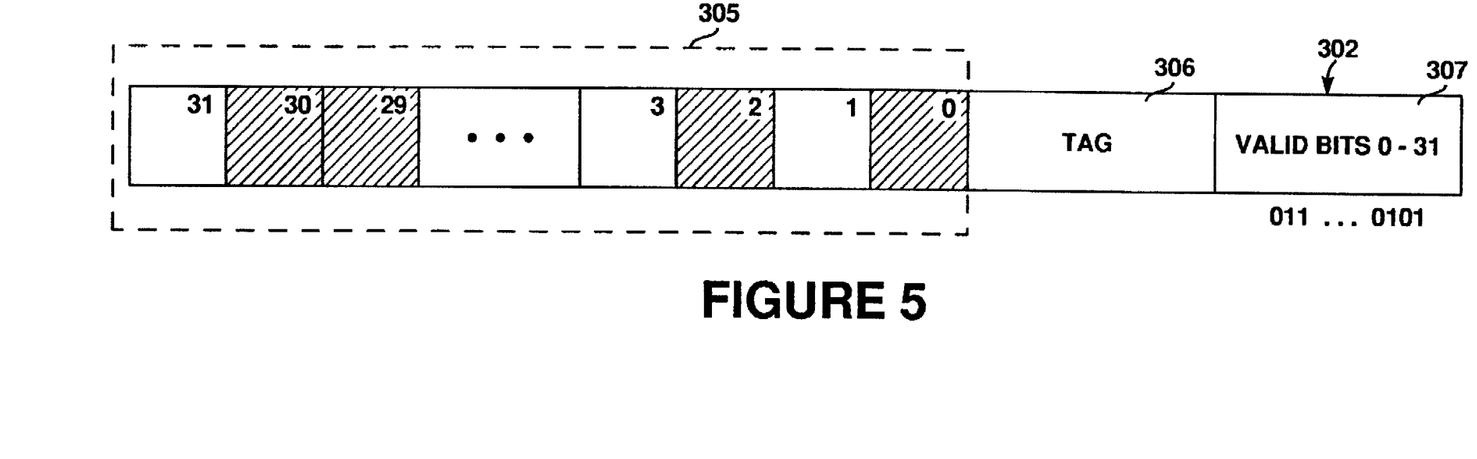
FIG. 5 shows the write combining buffer of FIG. 3 in greater detail.

FIG. 5 shows the write combining buffer 302 of FIG. 3 in greater detail. It can be seen that the write combining buffer 302 is relatively small. It is comprised of a single line. In FIG. 5, data is written to bytes 0, 2, . . . 29, and 30, as indicated by the shading. Hence, bits 1, 2, . . . 29, and 30 of the validity field 302 are set. All the other valid bits are not set. The tag field 306 specifies the addresses corresponding to the data stored in data field 305.

In alternative embodiments, multiple write combining buffers may be utilized. Furthermore, the present invention can be applied to non-cached as well as single or multiple cached systems as well as write through and writeback caches.

Thus, a write combining buffer for high performance bus transmissions is disclosed.

What is claimed is:

1. In a computer system having a memory for storing data and instructions and a microprocessor for processing said data and said instructions, a method of writing data to said memory comprising the steps of:

decoding an instruction to determine whether said instruction comprises a plurality of write operations on a block of data strings, each of said data strings being smaller than a line of data;

if it is determined that said instruction comprises a plurality of write operations on a block of data strings, each of said data strings being smaller than a line of data, for each write operation:
      determining whether an address of said write operation matches a tag entry of a buffer of said microprocessor; and
      writing data corresponding to said address to said buffer if said address matches said tag entry;

combining said data written to said buffer to generate a combined set of data, such that data is combined for select write operations.

2. The method of claim 1 further comprising the steps of:

performing an allocation of said buffer if said address of said write operation does not match said tag entry;
   changing said tag entry to correspond to said address;
   writing data corresponding to said address to said buffer.

3. The method of claim 2 further comprising the steps of:

setting a valid bit corresponding to each portion of data which has been written to said buffer, said buffer comprising a plurality of said portions;
   clearing all valid bits when said buffer is allocated.

4. The method of claim 2 further comprising the steps of:

determining whether an address of said write operation matches the changed tag entry of a data cache of said microprocessor;
   storing data corresponding to said address in said data cache if said address matches said changed tag entry of said data cache.

5. The method of claim 4 further comprising the steps of:

performing a read-for-ownership bus cycle;
   writing said combined set of data to said data cache.

6. The method of claim 4 further comprising the steps of:
performing an allocation bus cycle;
writing said combined set of data to said data cache.

7. The method of claim 1, wherein said determining steps and said combining step are transparent to an application program running on said microprocessor.

8. The method of claim 1, wherein said buffer is comprised of a 32-byte data register, a tag register, and a register of 32 valid bits.

9. The method of claim 1 wherein said buffer comprises a plurality of write combining buffers, each of said write combining buffers comprising a line of data and a corresponding address.

10. The method of claim 1, further comprising the step of writing said combined set of data to said memory, said step being performed using a burst cycle.

11. The method of claim 1, wherein said buffer also functions as a fill buffer.

12. The method of claim 1 further comprising the step of performing an allocation transaction that causes a cached copy of a process to be discarded.

13. The method of claim 1 further comprising the step of writing said combined set of data using arbitrary byte enables, said buffer comprising portions of invalid data.

14. A microprocessor comprising:
a bus;
a memory coupled to said bus for storing data and instructions;
a fetch and issue unit coupled to said bus for fetching data and instructions from said memory, decoding said instruction to determine if said instruction operates on an block of data strings, each of said data strings being smaller than a line of data, and issuing a write-combining micro-instruction if said decoding indicates that said instruction operates on such an block of data strings, said line of data comprising a unit of data most efficiently transferred by the bus;
an execution unit coupled to said bus and said fetch and issue unit for executing said instructions to process said data, said execution unit generating write operations corresponding to one of said write-combining micro-instructions;
a bus unit comprising a buffer which comprises a line of data coupled to said bus and said execution unit for combining data from at least one write combining operation with data from at least one said write combining operation corresponding to said write-combining micro-instruction into a data set when said buffer contains data from at least one previous write combining operation and writing data from write combining operation corresponding to said write-combining micro-instruction into said buffer when said buffer does not contain any data, said write combining operations comprising write combining operations corresponding to one of said write-combining micro-instructions, such that data is combined for select write-combining micro-instructions that comprise a plurality of write operations and said data set is transmitted over said bus in one write operation.

15. The microprocessor of claim 14, wherein said buffer is comprised of a data register for storing data, a tag register for storing an address corresponding to said data, and a validity register for storing a plurality of valid bits, each valid bit specifying whether a particular portion of said data register contains stored data, said data register comprising a plurality of mutually exclusive said portions.

16. The microprocessor of claim 15 further comprising an allocation circuit that allocates a line of said buffer if an address corresponding to a write combining operation to said buffer does not match said address of said tag register.

17. The microprocessor of claim 16 further comprising a clear valid bits circuit that clears said plurality of valid bits when said buffer is allocated.

18. The microprocessor of claim 15, wherein said data register comprises one line of data.

19. The microprocessor of claim 14, wherein operations of said buffer is transparent to an application program running on said microprocessor.

20. The microprocessor of claim 14, wherein said memory comprises a fill buffer, said buffer, being part of said fill buffer.

21. In a computer system having a memory means for storing data and instructions, a processing means for processing said data and said instructions, and a communication means for transmitting said data and said instructions between said processing means and said memory means, a write combining means for combining write data comprising:
an operation determination means for decoding an instruction to determine whether said instruction operates on a block of data strings, each of said data strings being smaller than a line of data, said line of data comprising a unit of data most efficiently transferred by the bus;
an address determination means for determining whether an address of a write operation matches a tag entry of said write combining means;
a write means coupled to said operation determination means and said address determination means for writing data corresponding to said write operation to said write combining means if said write operation operates on a block of data strings and if said address matches said tag entry;
a combining means coupled to said write means for combining a plurality of said data of said write operations to generate a combined set of data such that data is combined for select instructions that comprise a plurality of write operations;
a storage means coupled to said combining means for storing said combined set of data to said memory in a single write operation.

22. The write combining means of claim 21 further comprising:
a means for performing an allocation of a line of said buffer if an address of a write operation does not match said tag entry;
a means for changing said tag entry to correspond to said address;
a means for writing data corresponding to said write operation to said buffer.

23. The write combining means of claim 22 further comprising:
a means for setting a valid bit corresponding to each portion of data which has been written to said buffer, said buffer comprising a plurality of said portions;
a means for clearing all valid bits when said buffer is allocated.

24. The write combining means of claim 23, wherein said write combining means is comprises of a 32-byte data register, a tag register, and a register of 32 valid bits.

25. The write combining means of claim 21, wherein operation of said write combining means is transparent to an application program.

26. The write combining means of claim 21 further comprising:
- a means for determining whether said address of said write operation matches a tag entry of a data cache means of said processing means;
- a means for storing data corresponding to said write operation in said data cache means if said address matches said tag entry of said data cache means.

27. A computer system comprising:
- a bus;
- a memory coupled to said bus for storing data and instructions;
- a microprocessor coupled to said bus for processing said data and instructions, said microprocessor comprising:
- a fetch and issue unit coupled to said bus for fetching data and instructions from said memory, decoding said instruction to determine if said instruction operates on a block of data strings, each of said data strings being smaller than a line of data, and issuing a write-combining micro-instruction if said decoding indicates that said instruction operates on a block of said data strings, said line of data comprising a unit of data most efficiently transferred by the bus;
- an execution unit coupled to said bus and said fetch and issue unit for executing said instructions to process said data, said execution unit generating write operations corresponding to one of said write-combining micro-instructions;
- a bus unit comprising a buffer which comprises a line of data coupled to said bus and said execution unit for combining data from at least one write combining operation with data from at least one said write-combining operation corresponding to said write-combining micro-instruction into a data set when said buffer contains data from at least one previous write combining operation and writing data from write combining operation corresponding to said write-combining micro-instruction into said buffer when said buffer does not contain any data, said write combining operations comprising write combining operations corresponding to one of said write-combining micro-instructions, such that data is combined for select instructions that comprise a plurality of write operations and said data set is transmitted over said bus in one write operation.

28. The computer system of claim 27, wherein said buffer is comprised of a data register for storing data, a tag register for storing an address corresponding to said data register, and a validity register for storing a plurality of valid bits, each valid bit specifying whether a particular portion of said data register contains stored data, said data register comprising a plurality of mutually exclusive said portions.

29. The computer system of claim 28 further comprising an allocation circuit that allocates a line of said buffer if an address corresponding to a write operation to said buffer does not match said address of said tag register.

30. The computer system of claim 29 further comprising a clear valid bits circuit that clears said plurality of valid bits when said buffer is allocated.

31. The computer system of claim 28, wherein said data register comprises one line of data.

32. The computer system of claim 27, wherein operation of said buffer is transparent to an application program running on said computer system.

33. The computer system of claim 32, wherein for each write operation to said buffer which results in a hit, data corresponding to said write operation is stored to said data portion.

34. The computer system of claim 27, wherein said buffer is a fill buffer.

* * * * *

UNITED STATES PATENT AND TRADEMARK OFFICE
CERTIFICATE OF CORRECTION

PATENT NO. : 5,630,075
DATED : May 13, 1997
INVENTOR(S) : Joshi et al.

It is certified that error appears in the above-identified patent and that said Letters Patent is hereby corrected as shown below:

In column 1 at line 66 delete "writes in" and insert --writes. In--

In column 5 at lines 48-49 delete "PEP STOSX and PEP MOVSX." and insert --REP STOSX and REP MOVSX.--

In column 7 at line 11 delete "fails" and insert --falls--

In column 10 at line 10 delete "operations" and insert --operation--

In column 10 at line 63 delete "comprises" and insert --comprised--

Signed and Sealed this

Twenty-third Day of September, 1997

*Attest:*

BRUCE LEHMAN

*Attesting Officer*  *Commissioner of Patents and Trademarks*